US010160904B2

(12) United States Patent
McDaniel et al.

(10) Patent No.: US 10,160,904 B2
(45) Date of Patent: *Dec. 25, 2018

(54) VOLATILE SURFACTANT TREATMENT FOR SUBTERRANEAN FORMATIONS

(71) Applicant: Halliburton Energy Services, Inc., Houston, TX (US)

(72) Inventors: Cato Russell McDaniel, Montgomery, TX (US); Pubudu H. Gamage, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/912,198

(22) PCT Filed: Oct. 23, 2013

(86) PCT No.: PCT/US2013/066398
§ 371 (c)(1),
(2) Date: Feb. 16, 2016

(87) PCT Pub. No.: WO2015/060842
PCT Pub. Date: Apr. 30, 2015

(65) Prior Publication Data
US 2016/0200961 A1 Jul. 14, 2016

(51) Int. Cl.
*E21B 43/16* (2006.01)
*C09K 8/594* (2006.01)
*C09K 8/584* (2006.01)

(52) U.S. Cl.
CPC .............. *C09K 8/594* (2013.01); *C09K 8/584* (2013.01); *E21B 43/16* (2013.01)

(58) Field of Classification Search
None
See application file for complete search history.

(56) References Cited

U.S. PATENT DOCUMENTS

| 3,817,331 | A | | 6/1974 | Jones | |
|---|---|---|---|---|---|
| 4,353,806 | A | | 10/1982 | Canter et al. | |
| 4,828,029 | A | * | 5/1989 | Irani | C09K 8/584 166/268 |
| 5,033,547 | A | * | 7/1991 | Schievelbein | C09K 8/594 166/268 |
| 5,310,002 | A | | 5/1994 | Blauch et al. | |
| 5,363,915 | A | | 11/1994 | Marquis et al. | |
| 6,123,159 | A | | 9/2000 | Brookey et al. | |
| 6,794,550 | B2 | * | 9/2004 | Hintzer | C08F 6/16 524/462 |
| 7,547,797 | B2 | * | 6/2009 | Yamamoto | C08G 77/46 556/450 |
| 7,771,588 | B2 | | 8/2010 | Engel et al. | |
| 8,408,313 | B2 | * | 4/2013 | Yale | E21B 43/24 166/250.02 |
| 9,234,407 | B2 | * | 1/2016 | Meyer | E21B 41/0064 |
| 2003/0083206 | A1 | | 5/2003 | Masikewich et al. | |
| 2003/0127226 | A1 | * | 7/2003 | Heins | C02F 1/04 166/303 |
| 2005/0239957 | A1 | | 10/2005 | Pillsbury et al. | |
| 2007/0111903 | A1 | * | 5/2007 | Engel | B01D 17/047 507/261 |
| 2009/0200033 | A1 | | 8/2009 | Kakadjian et al. | |
| 2009/0253595 | A1 | * | 10/2009 | Qu | C09K 8/04 507/244 |
| 2012/0103635 | A1 | * | 5/2012 | Sanders | C09K 8/594 166/402 |
| 2012/0150519 | A1 | * | 6/2012 | Bang | E21B 43/16 703/10 |
| 2013/0068312 | A1 | * | 3/2013 | Sanders | B01F 5/0463 137/1 |
| 2013/0267570 | A1 | * | 10/2013 | Premachandran | A01N 43/16 514/372 |
| 2014/0251607 | A1 | * | 9/2014 | Sanders | C09K 8/584 166/270.2 |
| 2015/0361323 | A1 | * | 12/2015 | Gamage | C09K 8/035 166/305.1 |
| 2016/0069159 | A1 | * | 3/2016 | Teklu | C09K 8/52 166/305.1 |

(Continued)

FOREIGN PATENT DOCUMENTS

| WO | WO-9603474 A1 | 2/1996 |
|---|---|---|
| WO | 2015060842 A1 | 4/2015 |
| WO | WO-2015060891 A1 | 4/2015 |

OTHER PUBLICATIONS

1-Hexyn-3-ol,3,5-dimethyl- (cas 107-54-0) MSDS ; retrieved Jun. 5, 2017 from http://www.guidechem.com/msds/107-54-0.html.*
International Search Report and Written Opinion for PCT/US2013/066398 dated Jul. 9, 2014.
Stoilov, Yuri Yu, Fluorocarbons as Volatile Surfactants, Langmuir 1998, 14, 5685-5690.
Luffel et al., Matrix Permeability Measurement of Gas Productive Shales; D.L. Luffel, ResTech Houston; C.W. Hopkins, S.A., Holditch & Assocs. Inc.; and P.D. Schettler Jr., Juniata College; SPE 26633, 1993.
Griffin W.C.: Classification of Surface-Active Agents by HLB, Journal of the Society of Cosmetic Chemists 1 (1949): 311.
Griffin W.C.: Calculation of HLB Values of Non-Ionic Surfactants, Journal of the Society of Cosmetic Chemists 5 249 (1954): 249.

(Continued)

*Primary Examiner* — Angela M DiTrani
(74) *Attorney, Agent, or Firm* — Tenley Krueger; Tumey LLP

(57) ABSTRACT

A method of treating a treatment zone of a well, the method comprising: (A) forming a treatment fluid comprising: (i) a continuous gas phase comprising a gas; and (ii) a surfactant, wherein the surfactant has the following characteristics: (a) a normal boiling point less than 500° F. (260° C.) without significant thermal decomposition; and (b) providing a dynamic surface tension of less than about 40 dynes/cm for a 0.1 wt % solution, or having an HLB (Griffin) in the range of about 2 to about 20, or both; wherein the surfactant is dispersed in the gas; and (B) introducing the treatment fluid into the treatment zone.

14 Claims, No Drawings

(56) References Cited

U.S. PATENT DOCUMENTS

2016/0160115 A1  6/2016  Gamage et al.

OTHER PUBLICATIONS

Davies, J.T., A Quantitative Kinetic Theory of Emulsion Type. I. Physical Chemistry of the Emulsifying Agent, Gas/Liquid and Liquid/Liquid Interface, Proceedings of the International Congress of Surface Activity (1957): 426-438.
Hoffman, B. Todd, Comparison of Various Gases for Enhanced Recovery from Sale Oil Reservoirs, SPE 154329, 2012.
Menger et al., "Gemini Surfactants with Acetylenic Spacers," Langmuir 2000, 16, 2062-2067, 1999.
Mobeen Fatemi et al., "Experimental and Numerical Invenstigation of the Impact of Design Parameters of the Performance of WAG and SWAG Injection in Water-Wet and Mixed-Wet Systems," SPE 161827, 2013.
Surfynol® 104 Surfactant Data Sheet, Air Products, 2001.
Surfynol® 82 Surfactant Data Sheet, Air Products, not dated.
Surfynol® 61 Surfactant Data Sheet, Air Products, 1999.
Surfynol® Surfactant 104 Defoamer Nonionic Dynamic Wetting Agent and Molecular Defoamer, Air Products, 2013.

\* cited by examiner

VOLATILE SURFACTANT TREATMENT FOR SUBTERRANEAN FORMATIONS

TECHNICAL FIELD

The disclosure is in the field of producing crude oil or natural gas from subterranean formations. More specifically, the disclosure generally relates to methods of increasing the recovery of gas or oil from unconventional formations, such as shale formations.

BACKGROUND

Hydraulic fracturing and horizontal drilling has helped increase the hydrocarbon production from shale reservoirs in the last ten years. Higher initial production rates are achieved in the shale oil wells with the existing technology, however, reservoir pressure declines rapidly. Final oil recovery of the shale reservoirs remains only about 5% to about 10% of the original oil in place ("OOIP").

Water flooding cannot be used for the pressure maintenance in shale reservoirs due to the lower injectivity of water into such low permeable formations. Gas injection has been considered as a secondary recovery method in shale reservoirs due to the higher mobility of the gas; however, an unfavorable mobility ratio of gas to oil causes viscous fingering and leaves large quantities of un-swept oil in the reservoir using conventional gas floods.

Common enhanced oil recovery ("EOR") surfactants are non-volatile. Surfactants such as dodecylbenzene sulfonic acid and its salts list the boiling point of sulfuric acid, an impurity, as the lowest value for the mixture at 554° F. (290° C.). Ethoxylates such as the ethylene oxide/propylene oxide ("EO/PO") block copolymers have such high molecular weights that they decompose rather than have a normal boiling point on heating.

GENERAL DISCLOSURE

This disclosure provides a method of forming a treatment fluid including a surfactant having a relatively high volatility with a carrier gas and injecting the treatment fluid.

In an embodiment, a method of treating a treatment zone of a well is provided, the method comprising: (A) forming a treatment fluid comprising: (i) a continuous gas phase comprising a gas; and (ii) a surfactant, wherein the surfactant has the following characteristics: (a) a normal boiling point less than 500° F. (260° C.) without significant thermal decomposition; and (b) providing a dynamic surface tension of less than about 40 dynes/cm for a 0.1 wt % solution, or having an HLB (Griffin) in the range of about 2 to about 20, or both; wherein the surfactant is dispersed in the gas; and (B) introducing the treatment fluid into the treatment zone. It should be understood that one or more gases or one or more of such surfactants may be included in a treatment fluid according to the disclosure.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

DETAILED DESCRIPTION OF PRESENTLY PREFERRED EMBODIMENTS AND BEST MODE

Definitions and Usages

General Interpretation

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Each numerical value should be read once as modified by the term "about" (unless already expressly so modified), and then read again as not so modified, unless otherwise indicated in context.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Conventional Reservoirs

In a conventional reservoir, the hydrocarbons flow to the wellbore in a manner that can be characterized by flow through permeable media, where the permeability may or may not have been altered near the wellbore, or flow through permeable media to a permeable (conductive), bi-wing fracture placed in the formation. A conventional reservoir would typically have a permeability greater than about 1 milliDarcy (equivalent to about 1,000 microDarcy).

A conventional reservoir is usually in a shape that will trap hydrocarbons and that is covered by a relatively impermeable rock, known as cap rock. The cap rock forms a barrier above reservoir rock so that fluids cannot migrate beyond the reservoir. A cap rock capable of being a barrier to fluid migration on a geological time scale has a permeability that is less than about 1 microDarcy. Cap rock is commonly salt, anhydrite, or shale.

In addition, the hydrocarbons located in the reservoir are located vertically based on their density where the movement of one of the reservoir fluid can apply a driving force to another reservoir fluid. Most conventional reservoir rocks are limestone, dolomite, sandstone, or a combination of these.

Non-Conventional Reservoirs

In a non-conventional reservoir, the permeability is less than 1 milliDarcy. Non-conventional reservoirs include tight gas and shale formations.

Tight gas is natural gas that is difficult to access because the permeability is relatively low. Generally, tight gas is in a subterranean formation having a permeability in the range of about 1 milliDarcy (equivalent to about 1,000 microDarcy) down to about 0.01 milliDarcy (equivalent to about 10 microDarcy). Conventionally, to produce tight gas it is necessary to find a "sweet spot" where a large amount of gas is accessible, and sometimes to use various means to create a reduced pressure in the well to help draw the gas out of the formation.

Shale, which is conventionally considered to be a cap rock, can include relatively large amounts of organic material compared with other types of rock. Shale is a sedimentary rock derived from mud. Shale rock is commonly finely laminated (bedded). Particles in shale are commonly clay minerals mixed with tiny grains of quartz eroded from pre-existing rocks. Shale is a type of sedimentary rock that contains clay and minerals such as quartz. Gas is very difficult to produce from shale, however, because the permeability of the shale is often less than about 1 microDarcy. As used herein, an ultra-low permeable formation has a permeability of less than about 1 microDarcy.

Ultra-low permeable formations tend to have a naturally occurring network of multiple interconnected micro-sized fractures. The fracture complexity is sometimes referred to in the art as a fracture network. Ultra-low permeable formations can be fractured to create or increase such multiple interconnected micro-sized fractures. This approach can be used to help produce gas from such an ultra-low permeable formation.

Well Servicing and Fluids

To produce oil or gas from a reservoir, a wellbore is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Wells

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the word "tubular" means any kind of structural body in the general form of a tube. Tubulars can be of any suitable body material, but in the oilfield they are most commonly of steel. Examples of tubulars in oil wells include, but are not limited to, a drill pipe, a casing, a tubing string, a liner pipe, and a transportation pipe.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to a zone into which a fluid is directed to flow from the wellbore. As used herein, "into a treatment zone" means into and through the wellhead and, additionally, through the wellbore and into the treatment zone.

Generally, the greater the depth of the formation, the higher the static temperature and pressure of the formation. Initially, the static pressure equals the initial pressure in the formation before production.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

The term "damage" as used herein regarding a formation refers to undesirable deposits in a subterranean formation that may reduce its permeability. Scale, skin, gel residue, some wettability alterations, and hydrates are contemplated by this term.

Production Stages

"Primary production," also known as "primary recovery," is the first stage of hydrocarbon production, in which natural reservoir energy, such as gasdrive, waterdrive or gravity drainage, displaces hydrocarbons from the reservoir and into the wellbore. However, it is usually soon necessary to implement an artificial lift system from the wellbore adjacent the production zone to the wellhead, such as a rod pump, an electrical submersible pump or a gas-lift installation. Production to the wellhead by natural reservoir energy or using artificial lift is considered primary recovery. The primary recovery stage reaches its limit either when the reservoir pressure is so low that the production rates are not economical, or when the proportions of gas or water in the production stream are too high. During primary recovery, only a small percentage of the initial hydrocarbons in place are produced, typically around 10% for oil reservoirs.

"Secondary production," also known as "secondary recovery," is the second stage of hydrocarbon production. It requires reservoir injection, such as a water flooding techniques, to displace hydrocarbons from the reservoir and into the wellbore.

"Tertiary production," also known as "tertiary recovery," is the third stage of hydrocarbon production. The principal tertiary recovery techniques are thermal methods, gas injection, and chemical flooding.

The term "enhanced oil recovery" ("EOR") is an oil recovery enhancement method using sophisticated techniques, usually involving the injection of some substance that is not present in the reservoir. Once ranked as a third stage of oil recovery that was carried out after secondary recovery, the techniques employed during enhanced oil recovery can actually be initiated at any time during the productive life of an oil reservoir. Its purpose is not only to restore formation pressure, but also to improve oil displacement or fluid flow in the reservoir. The three major types of enhanced oil recovery operations are chemical flooding (alkaline flooding or micellar-polymer flooding), miscible displacement (carbon dioxide [$CO_2$] injection or hydrocarbon injection), and thermal recovery (steamflood or in-situ combustion). The optimal application of each type depends on reservoir temperature, pressure, depth, net pay, permeability, residual oil and water saturations, porosity and fluid properties such as oil API gravity and viscosity.

Phases and Physical States

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers up to a large drop on the scale of a few millimeters.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), for example, microscopic particles, to about 3 millimeters, for example, large grains of sand.

Dispersions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified in different ways, including, for example, based on the size of the dispersed particles, the uniformity or lack of uniformity of the dispersion, and, if a fluid, by whether or not precipitation occurs.

A heterogeneous dispersion is a "suspension" where the dispersed particles are larger than about 50 micrometers. Such particles can be seen with a microscope, or if larger than about 50 micrometers (0.05 mm), with the unaided human eye.

A heterogeneous dispersion is a "colloid" where the dispersed particles range up to about 50 micrometer (50,000 nanometers) in size.

Fluids

A fluid can be a homogeneous or heterogeneous. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, for example, a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

Every fluid inherently has at least a continuous phase. A fluid can have more than one phase. For example, a fluid can be in the form of a suspension (larger solid particles dispersed in a liquid phase), an emulsion (liquid particles dispersed in another liquid phase), a foam (a gas phase dispersed in a liquid phase), or an aerosol (liquid or solid particles dispersed in a gas phase).

Permeability

Permeability refers to how easily fluids can flow through a material. For example, if the permeability is high, then fluids will flow more easily and more quickly through the material. If the permeability is low, then fluids will flow less easily and more slowly through the material. As used herein, unless otherwise specified, permeability is measured with a light oil having an API gravity of greater than 31.1 degrees.

As used herein, "permeability" refers to the permeability of the matrix of the formation regardless of the fractures or microfractures of any major fractures or fracture network. Methods of measuring matrix permeability are known in the art. For example, one reference discloses: "Three laboratory methods were developed to measure matrix gas permeability (Km) of Devonian shale cores and drill cuttings at native water saturations. The first method uses pulse pressure testing of core plugs with helium. The second, new method uses pulse pressure testing of core chips or drill cuttings with helium. These methods gave comparable results on 23 companion shale samples from two wells, with Km=0.2 to $19 \times 10^{-8}$ md. The third, new method uses degassibility of core plugs with helium and methane, and yielded Km higher by a factor of 3 to 10. Most of the core plugs tested showed multiple microfractures that remain open at reservoir stress, and these dominate conventional flow tests. These microfractures are parallel to bedding, are coring induced, and are not present in the reservoir. Knowledge of Km is important in computer simulation modeling of long-term Devonian shale gas production, and has been a key to understanding the nature of the natural fracture network present in the reservoir." "Matrix Permeability Measurement of Gas Productive Shales"; D. L. Luffel, ResTech Houston; C. W. Hopkins, S. A. Holditch & Assocs. Inc.; and P. D. Schettler Jr., Juniata College; SPE 26633.

Wettability and Wetting of Solid Surfaces

Wettability involves the contact between a liquid and a solid surface, resulting from the intermolecular interactions when the two different phases are brought together. In general, the degree of wetting (wettability) is depends on a force balance between adhesive forces between the liquid and solid surface and cohesive forces of the liquid (i.e., surface tensions). Adhesive forces between a liquid and solid cause a liquid drop to spread across the surface. Cohesive forces within the liquid cause the drop to ball up and avoid contact with the surface.

One measurement of the degree of wettability is the contact angle, the angle at which the liquid interface meets the solid interface. If the wettability is very favorable to the liquid, the contact angle will be low, and the fluid will spread to cover or "wet" a larger area of the solid surface. If the wettability is unfavorable, the contact angle will be high, and the fluid will form a compact, self-contained droplet on the solid surface. If the contact angle of a water droplet on a solid surface is low, the surface may be said to be "water-wet" (and inversely, probably not oil-wet); whereas if the contact angle of an oil droplet on a solid surface is low, the surface may be said to be "oil-wet" (and inversely, probably not water-wet).

As used herein, a wet or wetted surface or the wetting of a surface may refer to a different liquid phase that is directly in contact with and adhered to the surface of a solid body. For example, the liquid phase can be an oleaginous film on the surface of a metallic tubular or the face of a borehole in the material of a subterranean formation.

Some fluids can form such a film or layer on a downhole surface, which can have undesirable effects. The fluid (or a liquid component of the fluid) can form a film or layer on the surface, which can act as a physical barrier between the material of the underlying solid body and a fluid adjacent to the surface of the solid body. In effect, such a film presents a different wettability characteristic than the material of the underlying solid body. For example, an oleaginous film on the surface of a metal tubular blocks water from wetting the underlying surface, which would otherwise be water-wet.

Wettability of Subterranean Formations in Wells

Recovery of a fluid from a formation depends on several factors and among them capillary pressure is one of the most important. The capillary pressure $\Delta P$ is governed by a simple, albeit approximate, relation as shown in the following Equation 1:

$$\Delta P = \frac{2\sigma}{r} \cos\theta \qquad \text{Eq. 1}$$

where $\sigma$ represents the surface tension of the fluid, r the radius of pore throat, and $\theta$ the contact angle of the fluid on the surface. For a certain formation, pore throat size r is constant, and therefore there are only two parameters, namely $\sigma$ and $\theta$, that can be adjusted to manipulate the capillary pressure.

Altering the wettability of a subterranean formation can help with the recovery of a fluid from the formation. Wetting and wettability involve the contact between a liquid and a solid surface, resulting from the intermolecular interactions when the two are brought together. The amount of wetting depends on the energies (or surface tensions) of the interfaces involved such that the total energy is minimized. One measurement of the degree of wetting is the contact angle, the angle at which the liquid-vapor interface meets the solid-liquid interface. If the wetting is very favorable, the contact angle will be low, and the fluid will spread to cover or "wet" a larger area of the solid surface. If the wetting is unfavorable, the contact angle will be high, and the fluid will form a compact, self-contained droplet on the solid surface. If the contact angle of water on a surface is low, the surface may be said to be "water-wet" or "water-wet," whereas if the contact angle of an oil droplet on a surface is low, the surface may be said to be "oil-wet" or "oil-wet."

As used herein, a water-wet surface has a contact angle for water between 0 to 90 degrees. A surface having a contact angle at or above ninety degrees for water is described as non-water wet. Similarly, an oil-wet surface has a contact angle for oil between 0 to 90 degrees. A surface having a contact angle at or above ninety degrees for oil is described as non-oil wet.

The wettability of the formation can be altered by changing the contact angle of the formation. By changing the contact angle, the capillary pressure to a water-based or oil-based fluid can be greatly changed. For example, when the contact angle θ becomes 90°, cos θ becomes zero, and so does the capillary pressure, or when the contact angle is larger than 90°, cos θ becomes negative, meaning the fluid is repelled by the pores in a subterranean formation.

General Measurement Terms

Unless otherwise specified or unless the context otherwise clearly requires, any ratio or percentage means by weight.

Converted to SI units, 1 darcy is equivalent to $9.869233 \times 10^{-13}$ m$^2$ or 0.9869233 (μm)$^2$. This conversion is usually approximated as 1 (μm)$^2$.

Oil gravity represents the density of the oil at stock tank conditions. The oil gravity has a very strong effect on the calculated oil viscosity ($m_o$) and solution gas oil ratio ($R_s$). It has an indirect effect on the oil compressibility ($c_o$) and the oil formation volume factor ($B_o$), since these variables are affected by the solution gas-oil ratio ($R_s$), which is a function of oil gravity. Usually the oil gravity is readily known or determined. It ranges from 60° API to 10° API. The conversion from API gravity (oil field units) to density (kg/m$^3$ (SI units)) is: 141.5/[° API gravity+131.5]. Oil is classified as heavy oil if it has an API gravity of less than 22.3° API, medium oil if it has an API gravity from 22.3 to 31.1° API, and light oil if it has an API gravity greater than 31.1° API. If unknown, the default value used is for a medium oil of 30° API.

General Approach

A purpose of this disclosure is to improve the recovery of oil from a tight formation by the injection of a volatile surfactant with a carrier gas into the formation. The surfactant can reduce the interfacial tension, alters the rock wettability, and acts as a detergent to remove the oil from the formation and render it more mobile.

In an embodiment, a method of treating a treatment zone of a well is provided, the method comprising: (A) forming a treatment fluid comprising: (i) a continuous gas phase comprising a gas; and (ii) a surfactant, wherein the surfactant has the following characteristics: (a) a normal boiling point less than 500° F. (260° C.) without significant thermal decomposition; and (b) providing a dynamic surface tension of less than about 40 dynes/cm for a 0.1 wt % solution, or having an HLB (Griffin) in the range of about 2 to about 20, or both; wherein the surfactant is dispersed in the gas; and (B) introducing the treatment fluid into the treatment zone.

Since the surfactant is dispersed in a gaseous phase and is volatile, the treatment fluid does not have injectivity or formation damage concerns. Without limitation, the technology of this disclosure can act as a secondary recovery method due to its pressure maintenance ability or an EOR method due to the surfactant in the injection gas. Surfactants can reduce the interfacial tension ("IFT") between oil and water; it also can alter the rock wettability. These factors will contribute to enhance final oil recovery from shale formations.

Many surfactants exist, but very few have any appreciable vapor pressure or volatility. Few surfactants exhibit significant volatility and can be easily vaporized or distilled. Many surfactants are ionic, but ionic materials are generally non-volatile, except for some ammonium salts or amine salts.

In general, according to the principle of this disclosure, the lower the volatility of the surfactant, the better. The potential materials are not limited to the currently commercially-available materials of the following examples, but other volatile materials can be used or made.

The surfactant dispersed in a gaseous phase will help to attain good injectivity in unconventional shale formations due to lower viscosity of the injection phase.

Methods according to the invention will provide higher recoveries of oil from the shale plays. The average oil recovery from shale reservoirs using prior technology is only about 8% OOIP. Even a 1% increase in total oil recovery would translate to more than a 10% increase in current production.

Implementation of disclosed technology would typically be in injector wells.

Continuous Gas Phase

A gas is a substance of one or more chemicals, each having the physical property of being in a gas phase at Standard Laboratory Conditions.

In various embodiments, the gas is selected from the group consisting of: elemental gases (for example, $H_2$, $N_2$, $O_2$, noble gases, and any combination thereof), molecular gases (for example, $CO_2$, $CH_4$, and any combination thereof), air, and any combination thereof.

In various embodiments, the gas is selected for being essentially free (that is, less than 0.001% by weight) of halogen atoms. Elements or chemicals of halogen atoms may be toxic or considered to be greenhouse gases. For example, although such gases may be otherwise functional for the purposes of a treatment according to the disclosure, it is usually desirable to avoid substantial concentrations of gases such as $F_2$, $Cl_2$, and certain chlorocarbons, fluorocarbons, chlorofluorcarbons.

In various embodiments, the surfactant is dispersed in the gas to form an aerosol or suspension in the gas.

The surfactants is preferably dispersed and distributed uniformly in the carrier gas, regardless of the mixing technique used.

In various embodiments, the concentration of the surfactant in the gas is in the range of about 0.001 wt % to about 0.25 wt %.

Surfactant

Surfactants are compounds that lower the surface tension of a liquid, the interfacial tension between two liquids, or that between a liquid and a solid, or that between a liquid and a gas. Surfactants may act as detergents, wetting agents, emulsifiers, foaming agents, and dispersants.

Surfactants are usually organic compounds that are amphiphilic, meaning they contain both hydrophobic groups ("tails") and hydrophilic groups ("heads"). Therefore, a surfactant contains both a water-insoluble (or oil soluble) portion and a water-soluble portion.

A surfactant can be or include a cationic, a zwitterionic, or a nonionic emulsifier. A surfactant package can include one or more different chemicals.

In a water phase, surfactants form aggregates, such as micelles, where the hydrophobic tails form the core of the aggregate and the hydrophilic heads are in contact with the surrounding liquid. The aggregates can be formed in various shapes such as spherical or cylindrical micelles or bilayers. The shape of the aggregation depends upon various factors such as the chemical structure of the surfactant (for example, the balance of the sizes of the hydrophobic tail and hydrophilic head), the concentration of the surfactant, nature of counter ions, ionic salt concentration, co-surfactants, solubilized components (if any), pH, and temperature.

As used herein, the term micelle includes any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. Micelles can function, among other purposes, to stabilize emulsions, break emulsions, stabilize a foam, change the wettability of a surface, or solubilize certain materials.

Surface Tension

In a mixture of two immiscible liquids containing interfacially active solutes, a freshly created interface will generally not be in compositional equilibrium with the two immiscible liquids it separates. It is only after solute redistribution from one or both phases (that is, adsorption) has occurred that this interface will achieve its equilibrium state. The interfacial tension of freshly created interfaces is known as "dynamic surface tension".

As used herein, a "low" dynamic surface tension (aka interfacial tension) means less than about 40 dynes/cm for a 0.1 wt % solution. Generally, the methods for determining surface tension include techniques known in the art, such as spinning drop, pedant drop, or bubble pressure. If there is any difference in the measurements obtained, the dynamic surface tension is measured with reference to a bubble pressure technique.

In various embodiments or preferably, the surfactant provides a dynamic surface tension of less than about 36 dynes/cm for a 0.1 wt % solution.

HLB Balance (Griffin or Davies) of a Surfactant

The hydrophilic-lipophilic balance ("HLB") of a surfactant is a measure of the degree to which it is hydrophilic or lipophilic, determined by calculating values for the different regions of the molecule, as described by Griffin in 1949 and 1954. Other methods have been suggested, notably in 1957 by Davies.

In general, Griffin's method for non-ionic surfactants as described in 1954 works as follows:

$$HLB=20*Mh/M$$

where Mh is the molecular mass of the hydrophilic portion of the molecule, and M is the molecular mass of the whole molecule, giving a result on a scale of 0 to 20. An HLB value of 0 corresponds to a completely lipidphilic/hydrophobic molecule, and a value of 20 corresponds to a completely hydrophilic/lypidphobic molecule. Griffin W C: "Classification of Surface-Active Agents by 'HLB,'" Journal of the Society of Cosmetic Chemists 1 (1949): 311. Griffin W C: "Calculation of HLB Values of Non-Ionic Surfactants," Journal of the Society of Cosmetic Chemists 5 (1954): 249.

The HLB (Griffin) value can be used to predict the surfactant properties of a molecule, where a value less than 10 indicates that the surfactant molecule is lipid soluble (and water insoluble), whereas a value greater than 10 indicates that the surfactant molecule is water soluble (and lipid insoluble).

The HLB (Griffin) value can be used to predict the uses of the molecule, for example, where: a value from about 4 to about 11 indicates a W/O (water in oil) emulsifier, and a value from about 12 to about 16 indicates O/W (oil in water) emulsifier.

In 1957, Davies suggested an extended HLB method based on calculating a value based on the chemical groups of the molecule. The advantage of this method is that it takes into account the effect of stronger and weaker hydrophilic groups. The method works as follows:

$$HLB=7+m*Hh-n*Hl$$

where m is the number of hydrophilic groups in the molecule, Hh is the respective group HLB value of the hydrophilic groups, n is the number of lipophilic groups in the molecule, and Hl is the respective group HLB value of the lipophilic groups. The specific values for the hydrophilic and hydrophobic groups are published. See, for example, Davies J T: "A quantitative kinetic theory of emulsion type, I. Physical chemistry of the emulsifying agent," Gas/Liquid and Liquid/Liquid Interface. Proceedings of the International Congress of Surface Activity (1957): 426-438.

The HLB (Davies) model can be used for applications including emulsification, detergency, solubilization, and other applications. Typically a HLB (Davies) value will indicate the surfactant properties, where a value of about 1 to about 3 indicates anti-foaming of aqueous systems, a value of about 3 to about 7 indicates W/O emulsification, a value of about 7 to about 9 indicates wetting, a value of about 8 to about 28 indicates O/W emulsification, a value of about 11 to about 18 indicates solubilization, and a value of about 12 to about 15 indicates detergency and cleaning.

Volatility, Vapor Pressure, and Boiling Point

Volatility is the tendency of a substance to vaporize. Volatility is directly related to the vapor pressure of a substance. At any given temperature, for a particular chemical compound, there is a vapor pressure at which the gas of that compound is in dynamic equilibrium with its liquid or solid forms. It is a measure of the tendency of molecules and atoms to escape from a liquid or a solid. The equilibrium vapor pressure is an indication of the evaporation rate. A substance with a relatively high vapor pressure at normal temperatures is often referred to as volatile.

The boiling point of a liquid corresponds to the temperature at which its vapor pressure is equal to the surrounding pressure. The boiling point at one atmosphere pressure is often called the "normal" boiling point of the substance. The higher the vapor pressure of a liquid at a given temperature, the higher the volatility and the lower the normal boiling point of the liquid.

Evaporation rates generally have an inverse relationship to boiling points; that is, the higher the boiling point, the lower the rate of evaporation.

Many chemical compounds exist or could be made that have desired characteristics according to this disclosure, of course, and a number are current commercial products.

In general according to this disclosure, the surfactant should have a normal boiling point less than 500° F. (260° C.) without significant thermal decomposition. As used herein, significant thermal decomposition means greater than about 10% by weight. In various embodiments, the surfactant has a normal boiling point less than about 230° C. (about 446° F.) without significant thermal decomposition.

In various embodiments, the surfactant is a liquid at Standard Laboratory Conditions.

Other Fluid Additives

In certain embodiments, the treatment fluids also can optionally comprise other commonly used such gaseous treatment fluid.

Additional Methods Steps for Treating a Well with the Treatment Fluid

According to various embodiments of the disclosure, methods of treating a well are provided, the methods including the steps of: forming a treatment fluid according to the disclosure; and introducing the treatment fluid into the well.

In various embodiments, a treatment according to the disclosure can be modeled, for example, by CMG IMEX or a similar reservoir simulator.

A treatment fluid can be prepared at the job site, prepared at a plant or facility prior to use, or certain components of the fluid can be pre-mixed prior to use and then transported to the job site.

In various embodiments, the preparation of a fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

A volatile surfactant selected according to the principles of the invention can be mixed with a carrier gas at a well site surface facility and injected into the formation.

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

Normal precautions should be taken to avoid any chemical spills during the fluid injection.

Laminar fluid flow is preferred since that would reduce the viscous fingering and increase the oil recovery In various embodiments, the step of introducing is at a rate and pressure below the fracture pressure of the treatment zone.

In general, a treatment fluid according to the disclosure is not expected to affect any conventional equipment used. In embodiments wherein $CO_2$ gas is included in the treatment fluid, corrosion may be increased due, however.

In various embodiments, the treatment zone is a portion of a tight gas formation.

In various embodiments, the treatment zone is a portion of a shale formation.

In various embodiments, a design temperature for the method in the treatment zone is selected for being less than 500° F. (260° C.). For example, in various embodiments, the design temperature is in the range of about 77° F. (25° C.) to about 500° F. (260° C.).

In various embodiments, the treatment fluid is introduced after a hydraulic fracturing treatment in the treatment zone.

In various embodiments, the treatment fluid is introduced into an injector well. In various such embodiments, the treatment fluid is recovered from a production well in fluid communication with the treatment zone.

In various embodiments of secondary recovery, the recovered treatment fluid or a component thereof is re-introduced into the well.

In various embodiments, the recovered treatment fluid or a component thereof is introduced into a different well.

In various embodiments, the treatment zone is a portion of a subterranean formation containing heavy oil.

A treatment fluid according to the disclosure that is injected into an injection well will not produce for a long period of time (usually more than one year), and even then it may be at a slow rate.

A conventional 3-phase separator will be used to separate the injected fluid from the produced hydrocarbons.

According to an embodiment of the disclosure, when the treatment fluid or components thereof are produced from a production well in fluid communication with the treatment zone, the fluid can be transported to the same or a different injection well for re-use.

Preferably, after any such use of a fluid according to the disclosure, a step of producing natural gas or crude oil from the well or a particular zone is the desirable objective.

EXAMPLES

To facilitate a better understanding of the present disclosure, the following examples of certain aspects of some embodiments are given. In no way should the following examples be read to limit, or define, the entire scope of the disclosure.

Acetylenic Germinal Alcohols

An example of a class of surfactants that has some members with such volatility is non-ionic surfactants of the acetylenic germinal alcohol type.

In particular, some of the SURFYNOL™ surfactants from Air Products are sufficiently volatile to be useful according to some of the methods of this disclosure.

The normal boiling Point of SURFYNOL™ 61 (3,5-dimethyl-1-hexyn-3-ol CAS 107-54-0) is 320° F. (160° C.).

SURFYNOL™ 61

The normal boiling point of SURFYNOL™ 82 (3,6-dimethyl-4-octyne-3,6-diol CAS 78-66-0) is 430° F. (221° C.).

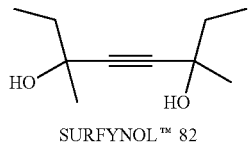

SURFYNOL™ 82

The normal boiling Point of SURFYNOL™ 104 (2,4,7,9-tetramethyl-5-decyne-4,7-diol CAS 126-86-3) is 430° F. (221° C.).

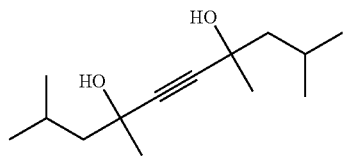

SURFYNOL™ 104

Such acetylenic germinal alcohol surfactants exhibit low dynamic surface tensions. The surface tensions for each of these volatile surfactants is believed to be less than about 40 dynes/cm. For example, the reported dynamic and equilibrium surface tensions for SURFYNOL™ 104 are shown in Table 1.

TABLE 1

Reported** Surface Tensions of SURFYNOL ™ 104 at 0.1 wt % Concentration

| At relative rate of surface formation (bubbles/sec) | Surface Tension (dynes/cm)* |
|---|---|
| 1 (at equilibrium) | 33.1 |
| 3 | 34.1 |
| 6 (dynamic) | 36.4 |

*Testing performed on SENSADYNE ™ 5000 tensionometer (Chemdyne).
**Air Products and Chemicals, Inc., SURFYNOL ™ 104 datasheet-120-9934-2-01.

Reducing the interfacial tension should increase the production, which is expected to of particular benefit when used in unconventional formations.

All such SURFYNOL™ compounds are non-ionic surfactants and should not produce any undesirable precipitates that might damage the permeability of the formation under the down-hole conditions. In addition, such compounds are at least sufficiently volatile and the vapor of such compounds should be carried into low permeable formations such as tight gas or shale much deeper or farther from the wellbore than other non-volatile materials.

In addition, such SURFYNOL™ are presently preferred surfactants for use according to this disclosure because they are not persistent in the environment and have relatively low toxicological impact.

Volatile Polyether-Modified Silicone

The surfactant can be selected from the group consisting of: polyether modified silicones.

For example, suitable polyether modified silicones are described in U.S. Pat. No. 7,547,797, having for named inventors Akira Yamamoto and Shoji Ichinohe, issued Jun. 16, 2009. In general, the surfactant has the formula (1):

$$AMe_2SiO(MeASiO)_nSiMe_2A \qquad (1)$$

wherein any one of A is a substituent group expressed by the following general formula (2), the remaining A are methyl groups, and n is an integer from 0 to 2; and

$$-C_aH_2O(C_2H_4O)_bR \qquad (2)$$

wherein in formula (2), a is 3-4, b is an integer from 1-7 and 1 is a methyl group or an ethyl group.

Volatile Fluorocarbon Surfactants

Fluorocarbon surfactants are generally described in Yuri Yu. Stoilov, *Fluorocarbons as Volatile Surfactants*, Langmuir 1998, 14, 5686-90.

For example, perfluorooctanoic acid (CAS 335-67-1) has a boiling point of 372° F. (189° C.). Ammonium perfluorooctanoic acid also could be used.

It should be noted that while a number of fluorocarbon surfactants are volatile, they have several significant problems including: (a) they are generally considered to be potent "green-house" gases and pollutants; and (b) they often have (for example, perfluorooctanoic acid) other toxic/carcinogenic properties. For such reasons, while these chemical compounds could be useful according to the general methods of this disclosure, they are not recommended for this application.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

The illustrative disclosure can be practiced in the absence of any element or step that is not specifically disclosed or claimed.

Furthermore, no limitations are intended to the details of construction, composition, design, or steps herein shown, other than as described in the claims.

What is claimed is:

1. A method of treating a treatment zone of a well, wherein the treatment zone is a portion of a tight gas formation or a portion of a shale oil or gas formation, the method comprising:
    (A) forming a treatment fluid comprising:
        (i) a continuous gas phase comprising a gas, wherein the gas is selected from the group consisting of elemental gases, $CO_2$, air, and any combination thereof; and (ii) a surfactant, wherein the surfactant has the following characteristics:
(a) a normal boiling point less than 500° F. (260° C.) without greater than about 10% thermal decomposition; and
(b) providing a dynamic surface tension of less than about 40 dynes/cm for a 0.1 wt % solution, or having an HLB (Griffin) in the range of about 2 to about 20, or both;
wherein the surfactant is dispersed in the gas; and
wherein the surfactant is selected from the group consisting of:
(a) polyether modified silicones;
(b) a surfactant having the formula (1):

$$AMe_2SiO(MeASiO)_nSiMe_2A \qquad (1)$$

wherein any one of A is a substituent group expressed by the following general formula (2), the remaining A are methyl groups, and n is an integer from 0 to 2;

$$—C_aH_{2a}O(C_2H_4O)_bR \qquad (2)$$

wherein in formula (2), a is 3-4, b is an integer from 1-7 and R is a methyl group or an ethyl group;
(c) a fluorocarbon; and
(d) perfluorooctanoic acid; ammonium perfluorooctanoic acid, or any combination thereof; and
(B) introducing the treatment fluid into the treatment zone.

2. The method according to claim 1, wherein the gas is selected for being essentially free of halogen atoms.

3. The method according to claim 1, wherein the surfactant is dispersed in the gas to form an aerosol or suspension in the gas.

4. The method according to claim 1, wherein the concentration of the surfactant in the gas is in the range of about 0.001 wt % to about 0.25 wt %.

5. The method according to claim 1, wherein the surfactant has a normal boiling point less than about 230° C. (about 446° F.) without greater than about 10% thermal decomposition.

6. The method according to claim 1, wherein the surfactant is a liquid at about 25° C. and about 1 atmosphere of pressure.

7. The method according to claim 1, wherein a design temperature for the method in the treatment zone is selected for being less than 500° F. (260° C.).

8. The method according to claim 1, wherein the treatment fluid is introduced after a hydraulic fracturing treatment in the treatment zone.

9. The method according to claim 1, wherein the treatment fluid is introduced into an injector well.

10. The method according to claim 9, wherein the treatment fluid is recovered from a production well in fluid communication with the treatment zone.

11. The method according to claim 10, wherein the recovered treatment fluid or a component thereof is re-introduced into the injector well.

12. The method according to claim 10, wherein the recovered treatment fluid or a component thereof is introduced into a different well.

13. The method according to claim 1, wherein the treatment zone is a portion of a subterranean formation containing heavy oil.

14. The method according to claim 1, wherein the surfactant injection alters the wettability of the formation to water wet or mixed wet conditions.

\* \* \* \* \*